M. W. MARSDEN.
COTTON GIN.
APPLICATION FILED MAY 20, 1915. RENEWED NOV. 1, 1917.
1,265,470.
Patented May 7, 1918.
4 SHEETS—SHEET 1.
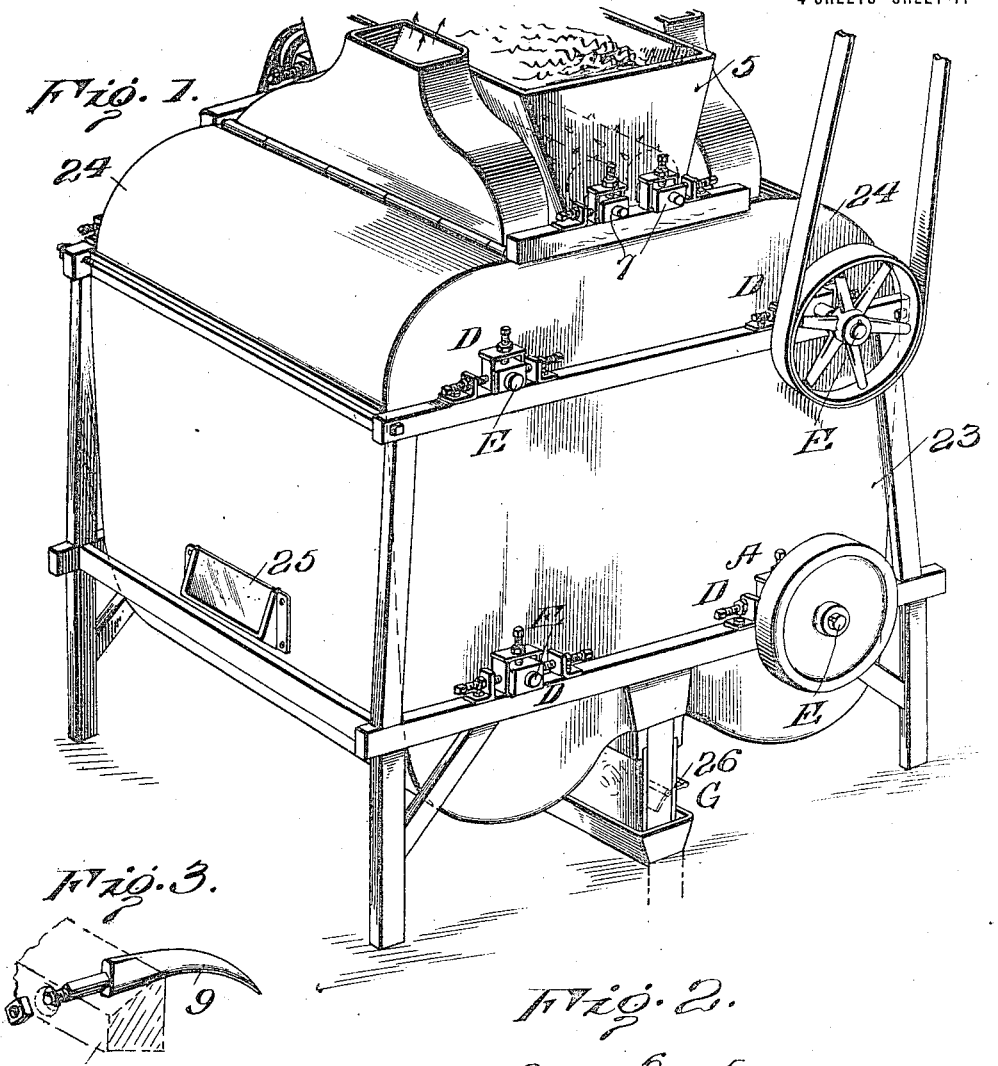
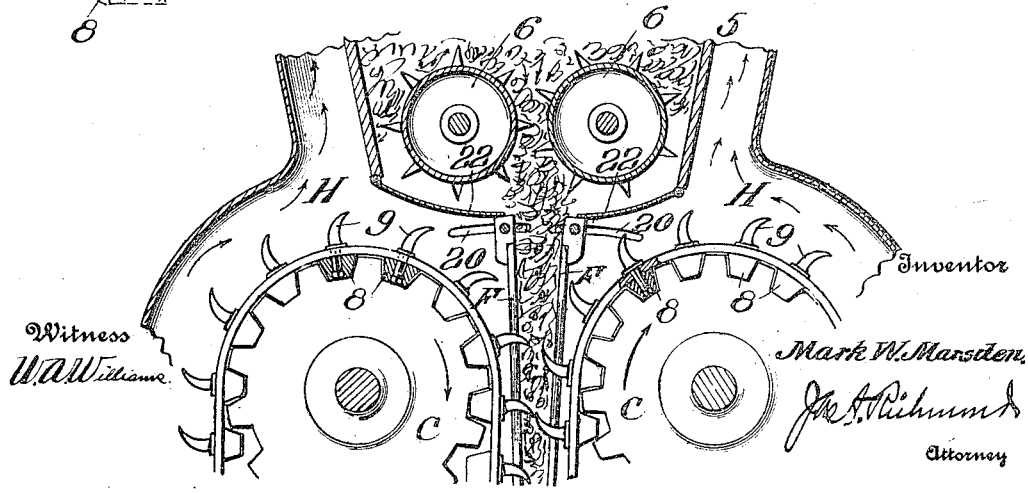

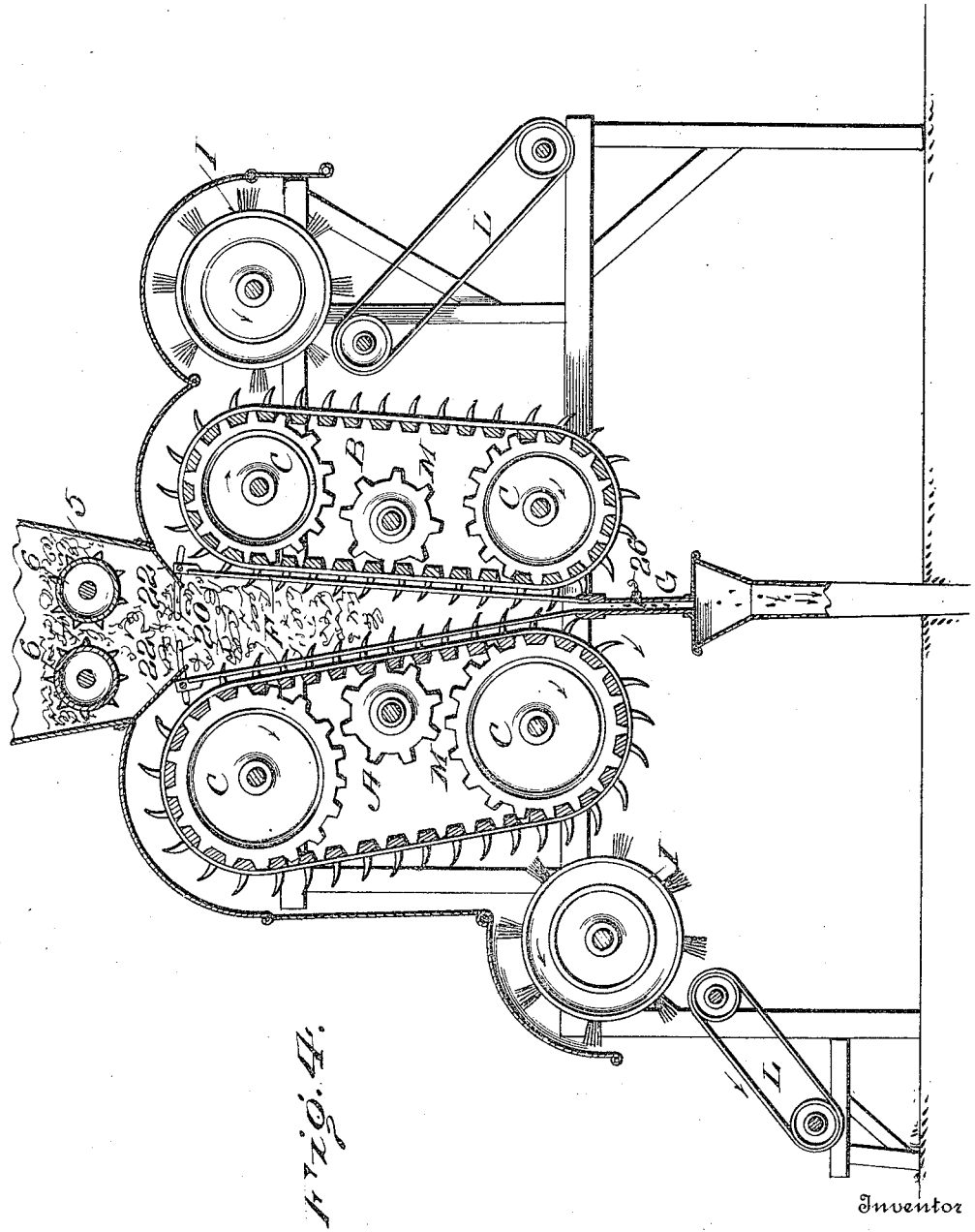

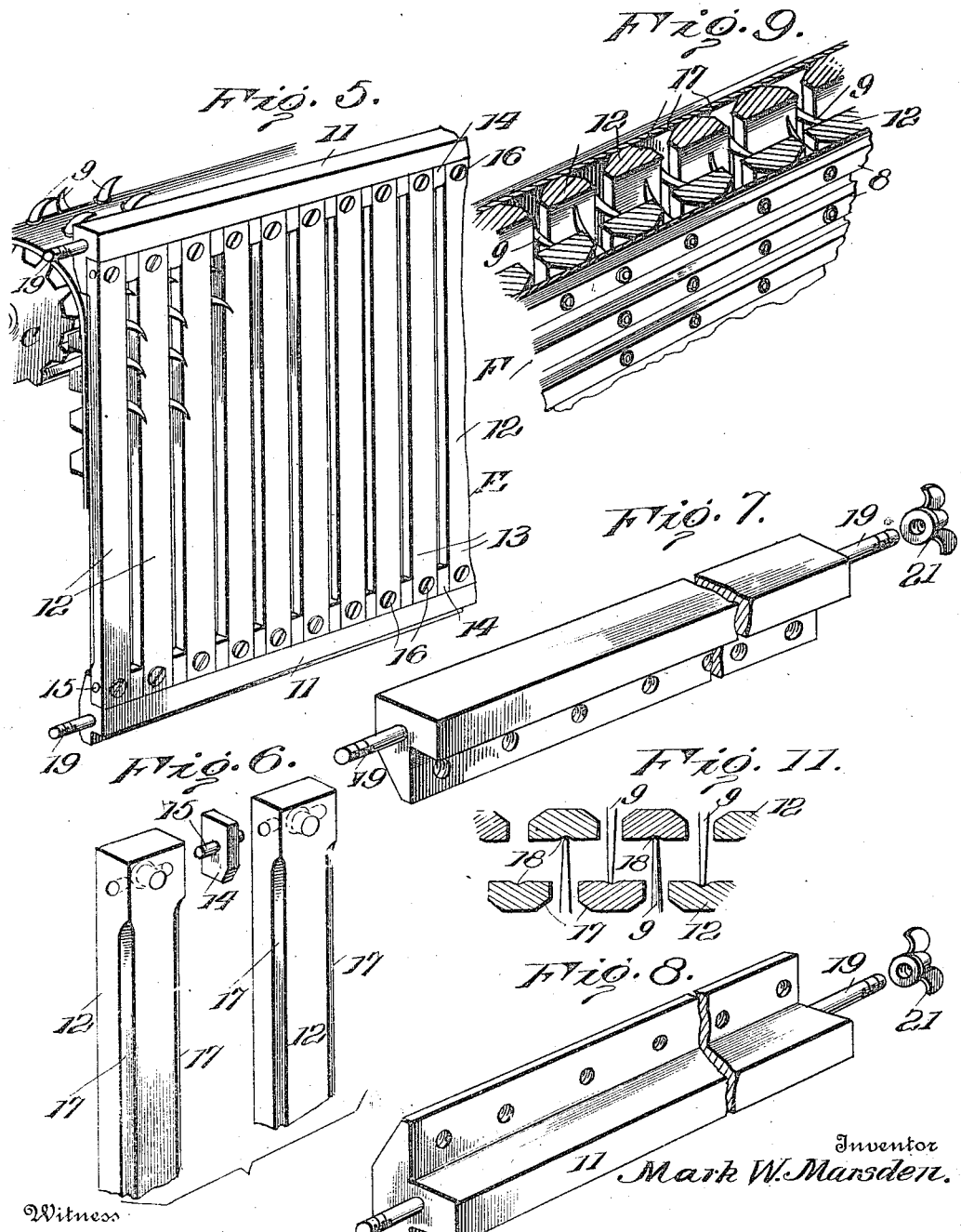

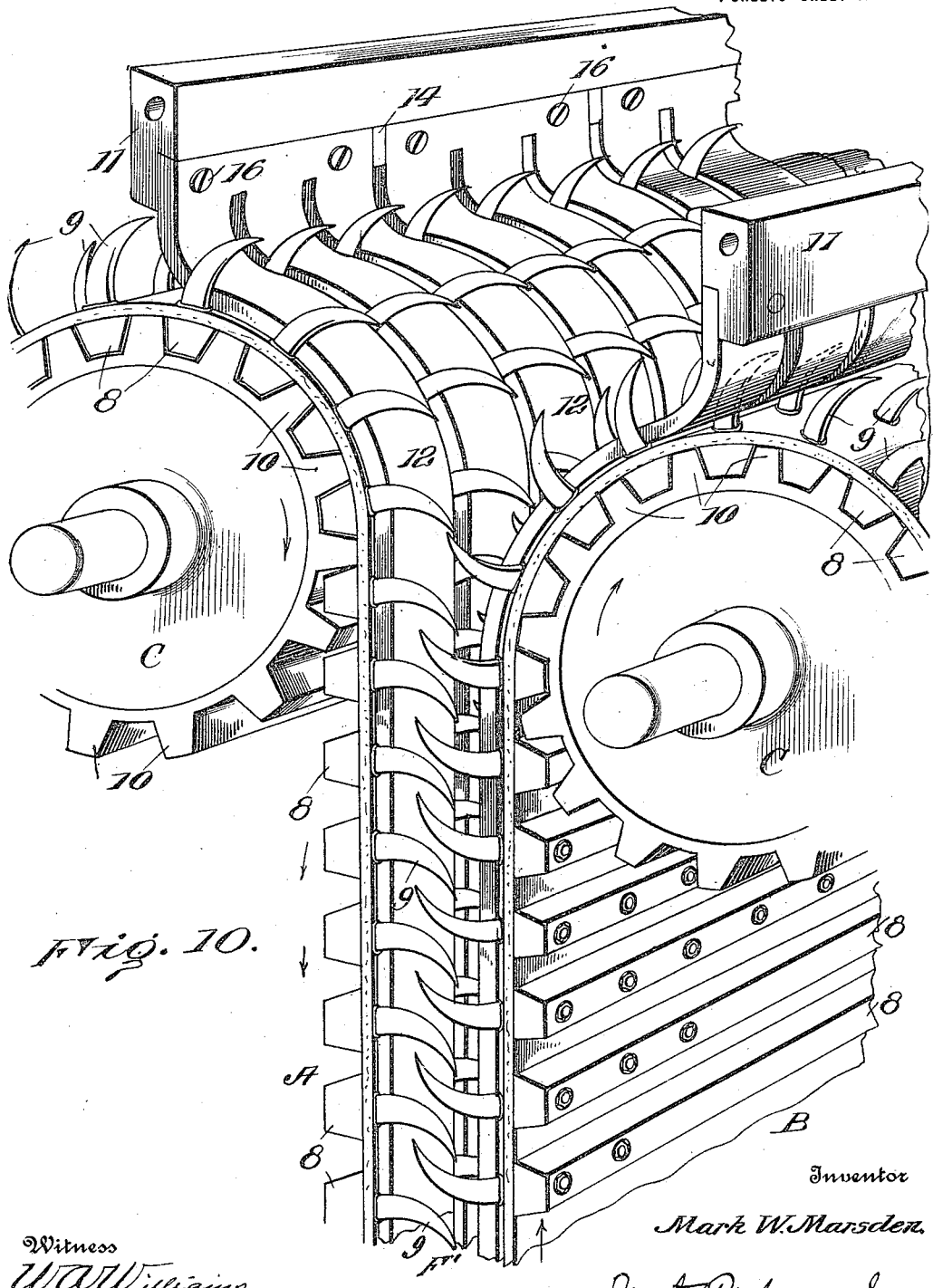

UNITED STATES PATENT OFFICE.

MARK W. MARSDEN, OF PHILADELPHIA, PENNSYLVANIA.

COTTON-GIN.

1,265,470.  Specification of Letters Patent.  Patented May 7, 1918.

Application filed May 20, 1915, Serial No. 29,305. Renewed November 1, 1917. Serial No. 199,799.

*To all whom it may concern:*

Be it known that I, MARK W. MARSDEN, a citizen of the United States, residing at Philadelphia, in the county of Philadelphia and State of Pennsylvania, have invented certain new and useful Improvements in Cotton-Gins, of which the following is a specification.

In my former application, Ser. No. 29,155, from which issued Patent No. 1,192,660, July 25, 1916, I have described and claimed a gin embodying essentially a pair of confronting ginning aprons which coöperate with suitable stripping mechanism to thoroughly and rapidly gin cotton without cutting, breaking or otherwise injuring the fiber. The present improvements while embodied in a machine of that general character are more particularly addressed to the stripping mechanism and to the means for removing the ginned cotton.

The nature, characteristic features and scope of the invention will more readily be understood from the following description taken in connection with the accompanying drawings forming a part hereof and wherein—

Figure 1 is a perspective view of a cotton gin constructed in accordance with my invention.

Fig. 2 is a sectional view, which includes the seed cotton feed, ginning devices, and suction flues for removing the ginned cotton.

Fig. 3 is a detail of one of the ginning teeth.

Fig. 4 is a sectional view of a machine in which brush cylinders are substituted for the suction flues.

Fig. 5 is a perspective view of one of the grids and its complemental apron.

Figs. 6, 7 and 8 are details of the grids.

Fig. 9 is a sectional view of the grids and aprons showing how the teeth are centered on opposed grids.

Fig. 10 is a perspective view of a modified structure wherein the grids are shaped to conform to the tops of the apron supports so as to facilitate the feed.

Fig. 11 is a sectional detail of a modification in which the grid bars are provided with grooves, channels or ways for the points of the opposed apron teeth.

The frame may be of any appropriate form and will not be specifically described.

The numeral 5 indicates the feed hopper in which the seed cotton is placed to be operated on by the machine. Any suitable and well known means may be employed for accelerating or regulating the feed, for example the coöperating feed rolls indicated at 6 mounted in bearings 7, which are adjustable in the well known manner to permit of adjustments of the rolls.

The hopper 5 is superimposed above the space formed by a pair of ginning aprons A and B, mounted upon apron supports or rolls C, which may be driven in any suitable manner and are so disposed that the aprons travel in substantially vertical planes. The aprons are relatively adjustable toward and away from each other in order to vary the distance between them. This may be accomplished by some suitable provision, such for example as the adjustable bearing boxes D, which accommodate the apron support journals E.

As fully explained in my application above referred to the aprons are constituted of endless belts of canvas, leather or other stiff flexible material, equipped with slats 8 that carry the ginning teeth 9 and also act as gear teeth or sprockets, which engage the teeth or corrugations 10 of the apron supports or rolls. The aprons with respect to their teeth are out of alinement so that the teeth are enabled to pass each other freely, as shown in Figs. 9, 10 and 11.

The apron A is designed to be driven in a downward direction and its teeth are so directed, which is the reverse of the teeth on the upwardly driven or right hand apron B. The latter is intended to be driven at a lower rate of speed than the downwardly traveling apron so that the main pull will be downward or toward the seed discharge. The purpose and effect of this is to cause the cotton seized by the aprons to be turned over and over and subjected to a pull in opposite directions, which makes for a rapid loosening of the seeds from the staple without tearing or otherwise injuring the latter.

Each apron coöperates with a stripper, consisting, as shown in Fig. 5, of a slotted partition or grid F, which may be a unitary structure, for example a single piece casting, or may be constituted of transversely ranging upper and lower framing sections 11, carrying spaced grid sections or gratings 12. The separable arrangement is perhaps advantageous over the single piece structure in that the intervals, spaces, or ways 13 in which the ginning teeth travel may be adjusted through the medium of distance pieces or spacing blocks 14 secured to place by for example the dowel pin arrangement 15 shown in Fig. 6. The upright bars or grid sections 12 are detachably secured to the framing sections 11 by screws or bolts 16. As will be observed upon reference to Figs. 6 and 9, the gratings 12 have beveled edges 17 to guide the ginning teeth and prevent the latter from binding. Fig. 9 especially, also illustrates how the opposed teeth are centered on the corresponding gratings. For the greater part of their travel through the grids the ginning teeth track or bear upon the gratings 12, which may present a plain or flat surface, or, as illustrated in Fig. 11, may be formed or provided with a groove, channel or recess 18 to accommodate the points of the ginning teeth.

In order that the grids may be correspondingly shifted in accordance with adjustments of the aprons and apron supports, the framing sections 11 are equipped with endwise projections 19 which penetrate slots 20 in some stationary part of the machine and may be secured for example by wing nuts 21.

The provision of the grids is advantageous because they extend from turn to turn of each apron and are effective for ginning purposes throughout their length.

G indicates a seed outlet of any appropriate design; and H H indicate flues adapted to operate in conjunction with any suitable suction apparatus to convey the ginned cotton away from the aprons.

In Fig. 4, instead of the suction flues I have illustrated brush or doffer cylinders I, which operate to remove the ginned cotton from the respective aprons and to discharge it upon endless belts or conveyers L.

The apron supports in addition to their to and fro adjustments for regulating the feed are also adjustable in the well known manner through the medium of their adjustable bearings D so as to take up slack and keep the aprons stretched. I may also provide the adjustable idlers M, which as explained in my former application have rolling contact with the aprons and in this case operate to hold the aprons well up to the grids.

In Fig. 2, the numeral 22 indicates wings or plates which are hinged or otherwise adjustably secured to the hopper 5, and the free ends of which rest loosely upon the tops of the grids and follow the latter in their adjustments and which operate as guides to properly direct the seed cotton to the grids.

In Fig. 10 is shown a modification of the grid structure. In this example the tops of the grids F' are shaped to conform to the apron turns, that is to say they form almost a quarter turn around the apron supports and are then directed upwardly so that they constitute in effect a throat or licker-in.

The suction flues may be formed separately or in part by the general housing 23. In any event, the latter is adapted and arranged to permit access to the flues, aprons, grids and other parts of the machine. In addition there may be doors 24 and windows or sight openings 25.

The seed outlet G is preferably provided with a gate or valve 26 in order that the seeds may be detained in the region of the ginning mechanism until they are devoid of fiber.

It will be obvious to those skilled in the art to which the invention relates that modifications may be made in details without departing from the spirit and scope of the invention. Hence the same is not limited other than may be required by the prior art.

Having described the nature and objects of the invention, I claim:—

1. In a machine of the type recited, the combination of a pair of aprons equipped with opposed ginning devices, grids coöperating with the aprons, and a valved seed outlet operatively disposed with relation to the grids.

2. In a machine of the type recited, the combination of a pair of opposed aprons equipped with coöperating ginning devices, a grid for each apron, and means for pressing the aprons against the respective grids.

3. In a machine of the type recited, the combination of a pair of opposed aprons equipped with ginning devices, means for effecting relative adjustments thereof, a grid for each apron, and means for adjusting the grids.

4. In a machine of the type recited, the combination of oppositely driven aprons equipped with ginning devices, and grids intermediate the aprons and extending from turn to turn thereof.

5. In a machine of the type recited, the combination of substantially vertically disposed opposed aprons equipped with ginning devices, and intermediate grids, one for each apron, extending from turn to turn thereof.

6. In a machine of the type recited, the combination of substantially vertically disposed opposed aprons equipped with ginning devices, and intermediate grids extending from turn to turn of the aprons and curved at the top to conform to the turn of the aprons.

7. In a machine of the type recited, the combination of substantially vertically disposed confronting traveling aprons equipped with ginning teeth, and a grid for each apron extending from turn to turn thereof and whereof the arrangement is such that the opposing teeth extend through one grid and are centered upon the other.

8. In a machine of the type recited, the combination of substantially vertically disposed confronting traveling aprons equipped with coöperating ginning devices intermediate strippers, one for each apron forming a feed space for seed cotton, and means to receive the ginned cotton.

9. In a machine of the type recited, the combination of substantially vertically disposed coöperating aprons equipped with ginning devices, stripping mechanism extending from turn to turn of the aprons, and suction flues coöperating with the aprons.

10. In a machine of the type recited, the combination of coöperating aprons equipped with ginning devices, and opposed grids mounted with relation to the aprons and arranged to accommodate the ginning devices.

In testimony whereof I affix my signature in presence of two witnesses.

MARK W. MARSDEN.

Witnesses:
H. A. HEGERTY,
JAS. A. RICHMOND.

Copies of this patent may be obtained for five cents each, by addressing the "Commissioner of Patents, Washington, D. C."